United States Patent [19]

Scranton, Jr.

[11] Patent Number: 5,792,438
[45] Date of Patent: Aug. 11, 1998

[54] PROCESS AND COMPOSITION FOR INCREASING THE REACTIVITY OF SULFUR SCAVENGING IRON OXIDES

[75] Inventor: Delbert C. Scranton, Jr., Chesterfield, Mo.

[73] Assignee: The SulfaTreat Company, Chesterfield, Mo.

[21] Appl. No.: 757,228

[22] Filed: Nov. 27, 1996

Related U.S. Application Data

[60] Provisional application No. 60/024,239 Aug. 20, 1996.

[51] Int. Cl.$^6$ ............................ B01D 17/00; B01D 15/08; B01D 53/48

[52] U.S. Cl. ................. 423/244.02; 423/230; 423/231; 210/749

[58] Field of Search ................... 423/231, 230, 423/244.02; 502/406; 208/244; 210/758, 749

[56] References Cited

U.S. PATENT DOCUMENTS

| | | | |
|---|---|---|---|
| 4,113,606 | 9/1978 | Mulaskey | 208/244 |
| 4,163,043 | 7/1979 | Dezael et al. | 423/234 |
| 4,246,244 | 1/1981 | Fox | 423/225 |
| 4,251,495 | 2/1981 | Deschamps et al. | 423/230 |
| 4,310,497 | 1/1982 | Deschamps et al. | 423/230 |
| 4,344,842 | 8/1982 | Fox | 585/850 |
| 4,366,131 | 12/1982 | Fox | 423/231 |
| 4,455,286 | 6/1984 | Young et al. | 423/230 |
| 4,550,098 | 10/1985 | Gens | 423/230 |
| 4,593,148 | 6/1986 | Johnson et al. | 423/210 |
| 4,634,539 | 1/1987 | Fox et al. | 423/222 |
| 4,690,806 | 9/1987 | Schorfheide | 423/230 |
| 4,695,366 | 9/1987 | Miller et al. | 208/91 |
| 4,722,799 | 2/1988 | Ashbrook et al. | 210/758 |
| 4,729,889 | 3/1988 | Flytani-Stephanopoulos et al. | 502/400 |
| 4,871,710 | 10/1989 | Denny et al. | 502/414 |
| 4,939,113 | 7/1990 | Tauster et al. | 502/303 |
| 4,983,367 | 1/1991 | Denny et al. | 423/230 |
| 4,990,318 | 2/1991 | Kidd | 423/230 |
| 4,996,181 | 2/1991 | Denny et al. | 502/414 |
| 5,147,620 | 9/1992 | Rozsa | 423/224 |
| 5,227,351 | 7/1993 | Gasper-Galvin et al. | 502/60 |
| 5,244,641 | 9/1993 | Khare | 423/231 |
| 5,447,551 | 9/1995 | Huestis et al. | 266/99 |
| 5,472,633 | 12/1995 | Griffin, Jr. et al. | 252/189 |
| 5,478,541 | 12/1995 | Samuels et al. | 423/231 |

FOREIGN PATENT DOCUMENTS

| | | | |
|---|---|---|---|
| 791411 | 1/1981 | U.S.S.R. | 423/230 |
| 90/14876 | 12/1990 | WIPO | 423/230 |

OTHER PUBLICATIONS

Guidelines set for handling sour gas, *Oil & Gas Journal*, Jun. 26, 1978.
Iron sponge: Still a top option for sour gas sweetening, *Oil & Gas Journal*, Feb. 18, 1985.
Iron sponge is economical and effective for NGL sweetening, *Oil & Gas Journal*, Sep. 23, 1985.
Sieves replaced by DEA system in gas plant to boost ethane recovery, *Oil & Gas Journal*, Oct. 20, 1986.
Handling hydrogen sulfide in drilling fluids; part 2, *World Oil*, Dec. 1989.
Measurement records vital for effective program, *Oil & Gas Journal*, Jul. 9, 1990.
Rounding Up Sulfur, *Chemical Engineering*, Feb., 1995.
Getting the details right. Sulphuric Acid Technology, *Sulphur*, Jul., 1995.

*Primary Examiner*—Gary P. Straub
*Assistant Examiner*—Peter DiMauro
*Attorney, Agent, or Firm*—Haverstock, Garrett & Roberts

[57] ABSTRACT

In ridding fluids, including hydrocarbon fluids, both gaseous and liquid, of sulfur compounds including hydrogen sulfide, oxides of sulfur, and thiols, the present invention uses a small quantity of an activator, generally a noble metal oxide, preferable a copper oxide, along with a known oxide product such as iron oxide to thoroughly remove sulfur contaminants in a short amount of time. The activator allows for the use of smaller reactor vessels and the production of hydrocarbon fluids substantially free of sulfur products.

2 Claims, 1 Drawing Sheet

5,792,438

PROCESS AND COMPOSITION FOR INCREASING THE REACTIVITY OF SULFUR SCAVENGING IRON OXIDES

This application claims the benefit of U.S. Provisional application Ser. No. 60/024,239 filed Aug. 20, 1996.

FIELD OF INVENTION

This invention relates to the activation of oxide products that are reactant with sulfur compounds, wherein the activated oxide products sweeten fluids, both gases and liquids, polluted with sulfur-bearing compounds such as hydrogen sulfide and thiols (mercaptans). Preferably, this invention relates to improving the removal of sulfur compounds from hydrocarbon streams by adding an activator to an iron oxide product which increases the rate of reactivity of the iron oxide product with the sulfur compounds found in hydrocarbon streams.

BACKGROUND OF THE INVENTION

Oxides, particularly iron oxides, supported on inert particulate matter have long been used in flow-through packed-bed processes to react with and scavenge hydrogen sulfide and thiols (mercaptans) present in natural gases and liquid hydrocarbons. The reactions between oxides and sulfides traditionally have been relatively slow, as compared to other sulfur removal or gas sweetening systems. Because of the slow rate of reaction, large iron oxide beds contained in large reactor vessels have been required in order to adequately remove hydrogen sulfide and thiols from the hydrocarbon fluids. The larger reaction vessels allow for longer contact times between the oxides and the sulfur compounds, with the longer contact times being necessary to adequately remove the sulfur compounds. A somewhat offsetting advantage to the slowness and size requirements of the iron oxide beds is that the reacted iron oxide bed material may be disposed of as non-toxic waste, unlike some other sulfur removal processes which require toxic waste disposal systems.

Current iron oxide based products designed to remove sulfur compounds from gas or vapor streams have performance limitations. An example of such a performance limitation relates to minimum hydrocarbon fluid or gas residence time in a reactor vessel, as the residence time required for the gas in the vessel limits the space and practical vessel size in some cases. Minimum gas exposure or retention time in low pressure iron oxide beds typically ranges between about 1 to about 1.3 minutes based on the amount of unoccupied bed space and actual gas volume. Thus, large diameter vessels and beds are typically required for efficient design common in low pressure iron oxide bed applications. Large diameter vessels are also required in high pressure oxide processes, and, like low pressure iron oxide beds, are very expensive. Because of the lengthy gas retention time, it is difficult to fit vessel sizes into "small foot print" applications like offshore drilling or limited space plant facilities. Consequently, a problem exists because small vessel sizes cannot be used to sweeten hydrocarbon fluids, meaning certain facilities do not have access to packed bed iron oxide processes. Because of the space limitation, it would be desirable to have an iron oxide bed that required less space and was still capable of sweetening hydrocarbon fluids.

Unplanned increases in gas volumes and inlet hydrogen sulfide levels, beyond the design capacity of normal iron oxide beds, cause under-utilization of the iron oxide product and excessive costs. Iron oxide systems that are properly designed initially can experience increased gas flow and/or higher levels of hydrogen sulfide that significantly exceed normal design conditions resulting in inefficient utilization of iron oxide type products and substantially higher operating costs. Because unplanned increases in volume frequently occur, it is desirable to have a product and process that can handle increases in volume without wasting the iron oxide product.

An additional problem involves hydrocarbon fluids, gas and liquid, that are less than totally water saturated, as the unsaturated hydrocarbon fluids require long contact times to effectively remove hydrogen sulfide. Also, systems designed for water saturated conditions operate inefficiently when the fluid is not water saturated. Natural gas and vapor, and liquid hydrocarbon streams that are less than totally water saturated will result in the decreased removal efficiency of hydrogen sulfide by the iron oxide product and higher operating costs. Thus, a problem exists because current iron oxide products are commercially efficient only in the removal of dissolved hydrogen sulfide or other sulfur compounds in hydrocarbon fluids if there is sufficient contact time and the hydrocarbon fluids are saturated. Often, however, it is not practical to inject water to fully saturate the hydrocarbon fluid to achieve normal hydrogen sulfide removal. Consequently, it is desirable to have a system for sweetening hydrocarbon fluids that does not require the hydrocarbon fluids to be totally water saturated.

Systems designed to control odors in vapors from waste-water and oil tanker vent scrubber systems often utilize blowers and pressure boosters that create unsaturated gas or vapor streams by changing the physical properties of the hydrocarbon fluids. These operational practices can reduce the efficiency of iron oxide products in removing hydrogen sulfide and other sulfur compounds from fluids. Thus, it is desirable to have a system that can remove hydrogen sulfide and other sulfur compounds from gas and vapor streams that have constantly changing physical properties.

Additionally, some systems may inject air into the hydrocarbon fluid. The injection of air, which includes oxygen, causes increased corrosion and safety concerns despite increased capacity for hydrogen sulfide removal. The intentional and unintentional inclusion of air, including oxygen, in natural gas or vapor streams has long been seen to increase the capacity of iron oxide impregnated wood chips and other oxide products to react with hydrogen sulfide. However, corrosion and safety concerns are greatly increased due to the presence of oxygen, which will react with the vessel containing the oxide product. Also, many natural gas contracts specifically limit the amount of oxygen in the gas and some contracts prohibit the intentional injection of air due to problems caused downstream in gas transportation systems. The inclusion of a "non-oxidizer" stimulant or activator in the iron oxide product that enhances the capacity of sulfur removal, without the associated problems of organic and inorganic oxidizers, like air, would enhance the use of oxide products in sulfur removal processes.

Liquid hydrocarbons commonly include dissolved hydrogen sulfide and other sulfur compounds. In some cases, the hydrogen sulfide removal sufficiently meets the required product quality for sales to pipelines and transporters. Frequently, however, other sulfur compounds, such as mercaptans, carbonyl sulfides, and carbon disulfide need to be removed to meet required sulfur limits and product quality tests before the hydrocarbons can be sold. An improved iron oxide product that would efficiently remove hydrogen sulfide and other sulfur compounds to meet required sulfur limitations in hydrocarbon fluids would significantly increase the commercial utility of iron oxide sulfur removal processes.

Thus, it is desirable to have an iron oxide bed process and composition that functions in a small reactor vessel, removes sulfur compounds in a short amount of time, removes sulfur compounds from unsaturated fluids, does not require the injection of air, and removes most if not all of the sulfur compounds in a fluid, particularly a hydrocarbon fluid. As will be seen the present invention activates the oxide bed process and composition to meet the above listed criteria.

SUMMARY OF THE INVENTION

The present invention relates to the use of an activator in an oxide product reactant with sulfur compounds. The activator increases the rate of reactivity of the oxide product with sulfur compounds contained in fluids. Preferably, the activator will have a higher electro-potential than the oxide product so that when the activator is coupled with the oxide product the coupling will result in an increase in the reactivity of the oxide product with sulfur compounds contained in fluids. Additionally, when the oxide product and the activator are coupled, the oxide product can remove sulfur compounds, including oxides of sulfur, hydrogen sulfide, and thiols, from fluids including saturated and unsaturated fluids, as well as, liquid, gas, or a combination thereof, and not just hydrocarbon fluids.

Typically, the activator is a noble metal oxide and the oxide product is an iron oxide product. One of the most preferred embodiments of the activator involves the use of small amounts of copper oxide, either cuprous and/or cupric, added to a conventionally-made sulfide reactant oxide-bed, such as an iron oxide bed. An example of such an iron oxide bed used for hydrogen sulfide removal is found in U.S. Pat. No. 5,320,992. The copper oxide activator reacts with the iron oxide product in the iron oxide bed to increase the rate of reactivity of the iron oxide product with sulfur compounds found in fluids, including hydrocarbon fluids. The increased reactivity of the iron oxide product caused by the copper oxide activator results in the completion of the sulfur compound removal reaction in less than half the time of a normal sulfur removal reaction, making feasible the use of iron oxide beds equal to half, or less, in volume than conventional beds. This unexpected result is believed to be due to the substantially higher electro-potential of the copper oxides as compared to the iron oxides. Additionally, the use of limited amounts of copper oxide activator will prevent the exhausted bed from being rated as a hazardous waste by the current standards promulgated by the Environmental Protection Agency.

According to another aspect of the present invention, even when the hydrogen sulfide-tainted fluids include thiols, mercaptans in particular, offensive odors are completely eliminated along with a reduction of total sulfur content to levels acceptable to commercial purchasers. Another aspect of the invention is that hydrocarbon fluids do not have to be saturated in order to have the oxide product, coupled with an activator, adequately remove thiols (mercaptans).

Because the inventive activator effectively raises the rate of reactivity of oxide products, this invention results in the improvement in the use of disposable oxide products for the removal of sulfur compounds from natural gas and vapors, and other hydrocarbon liquids. Thus, the present invention is desirable because it allows for an oxide product that can be contained in a small reactor vessel, the removal of sulfur compounds in a short amount of time, the removal of sulfur compounds from unsaturated hydrocarbon fluids, the non-inclusion air, and the thorough removal of the sulfur compounds from fluids.

DESCRIPTION OF THE PREFERRED EMBODIMENTS

Figure 1:
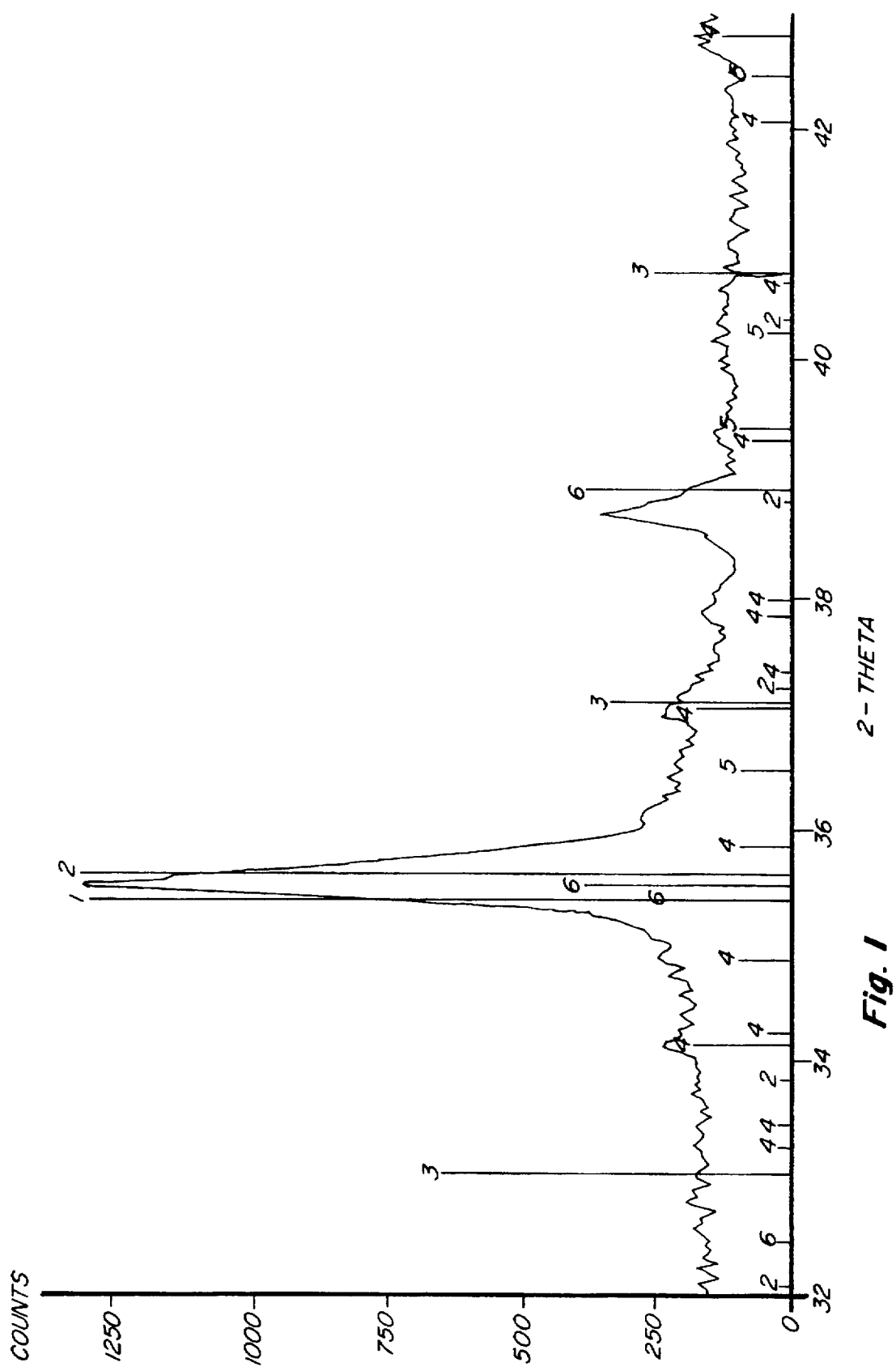
FIG. 1 is an X-ray diffraction reading showing the presence of copper oxide after having hydrogen sulfide pass through an iron oxide product.

In accordance with the present invention an activation method and composition are provided for increasing the reactivity of oxide products, preferably iron oxide products, with sulfur compounds in contaminated fluids, including gas, liquid, or a combination thereof, resulting in the removal of the sulfur compounds from the fluids. The oxide products that react with sulfur compounds are also know as sulfide reactant oxides. The process is initiated by adding an activator composition, preferably a noble metal oxide, to the iron oxide product, preferably a packed-bed iron oxide product. The noble metal oxide activator will react with the iron oxide product to increase the reactivity of the iron oxide product with sulfur compounds. The reaction between the activator and iron oxide product causes the iron oxide product to more readily react with sulfur compounds, such as thiols, oxides of sulfur, and hydrogen sulfide ($H_2S$), resulting in the removal of the sulfur compounds from various fluids. Preferably, the sulfur compounds are removed from the hydrocarbon fluids so that upon removal of the sulfur compounds the hydrocarbon fluids can be used for commercial purposes.

The process, as stated, involves adding an activator to an iron oxide product reactant with sulfur compounds, with the activator reacting with and activating the iron oxide product. The activator increases the reactivity of the iron oxide product with sulfur compounds which can be found in hydrocarbon fluids. The activator may be selected from the noble metal oxides, which includes, but is not limited to, platinum oxide, gold oxide, silver oxide, copper oxide, cadmium oxide, nickel oxide, palladium oxide, lead oxide, mercury oxide, tin oxide, and cobalt oxide. In addition to the noble metal oxides, alloys made of noble metals may also be used. The most preferred noble metal oxide, is copper oxide, either cuprous or cupric oxide. Also, a combination of cuprous and cupric oxide may be used. Regardless of the noble metal oxide selected, the activator is designed to increase the efficiency of treatment of fluids with known iron oxide products.

The activator causes increased reactivity in the iron oxide product because it has a higher electro-potential than the iron oxide product with the dissimilar electro-potential causing bimetallic coupling between the activator, copper oxide for example, and the iron oxide product. This bimetallic coupling results in an increased rate of reaction between the iron oxide product and the sulfur compounds found in fluids, in particular hydrocarbon fluids. The activator causes the iron oxide to be more reactive by increasing the corrosion rate of the iron oxide, which causes an increased reactivity between the iron oxide product and sulfur compounds. Essentially, the activator causes the iron oxide to react with the sulfur compounds before the activator reacts with the sulfur compounds. More specifically, while copper oxide is known to react quickly with hydrogen sulfide, this reaction takes place after the reaction of the activated iron oxide with the hydrogen sulfide, with the reaction between the copper oxide and the hydrogen sulfide continuing longer than the concentration of activator accounts for. This is demonstrated in FIG. 1, which show the presence of copper oxide in an iron oxide be after having sulfur compounds pass through and react with the iron oxide bed. The presence of copper oxide is shown in FIG. 1 by line 6, with FIG. 1 being an X-ray diffraction reading taken after the activated iron oxide product had removed hydrogen sulfide from hydrocarbon gas. In particular, FIG. 1 shows that the copper oxide activated the iron oxide to react first, as the amount of hydrogen sulfide that was passed through the iron oxide bed was equal to eight (8) times more hydrogen sulfide than would be necessary to exhaust the copper oxide present in the iron oxide bed. Because the copper oxide did not completely react with the hydrogen sulfide this indicates that the iron oxide reacted with the hydrogen sulfide before the copper oxide. In addition to coupling with and activating iron oxides, the activator can be used to activate other oxides. The other oxides, besides iron oxide, are oxides having a lower electro-potential than the activator.

An amount of activator equal to less than 1% by total weight of the iron oxide product, is sufficient to increase the reactivity of the iron oxide product with the sulfur species. Thus, the addition of a small amount of the activator, such as copper oxide, in combination with an iron oxide product results in a faster reaction with hydrogen sulfide, thiols (mercaptans), and other sulfur compounds, including carbonyl sulfide and carbon disulfides. In addition to increasing the reactivity of the iron oxide product, the copper oxides are preferred because they are readily available and meet current environmental standards as promulgated by the Environmental Protection Agency. Finally, dependence upon fully water saturated gas or vapor streams for efficient sulfur removal is not necessary due to the higher reaction rates caused by the activator of this invention.

Use of copper oxide as an activator is also desirable because it generally does not corrode the reactor vessel. When unprotected mild steel equipment, such as the reactor vessels that house the iron oxide beds, is exposed to copper ions corrosion of the steel can result. However, because a relatively small amount of noble metal oxide, preferably copper oxide, is used, the reactor vessel is not significantly corroded. Reactor vessel corrosion rates are not significantly higher than current iron oxide products due to the minimal presence of copper ions that cause high corrosion rates.

The oxide product that reacts with sulfur is also known as sulfide reactant oxide and is selected from a metal oxide group having a lower electro-potential then the activator. Typically, the oxide product is an iron oxide product which can be either $Fe_2O_3$, $Fe_3O_4$, or a combination thereof. An alternative to the iron oxide product is a zinc oxide product. Normally, the iron oxide product is combined with an inert bed material to form an iron oxide bed that is housed in a reactor vessel; but, it is not necessary to combine the iron oxide product with a bed material, inert or otherwise. When the iron oxide bed is made of an inert carrier material, the iron oxide product attaches to the inert carrier material which holds the iron oxide product in place when contacted with hydrocarbon fluids. Preferably, the inert carrier is a calcinated montmorillonite carrier which is desirable because it is non-hazardous, stable, reliable, and easy to clean. Instead of an inert carrier the iron oxide product can be combined with other carriers such as water. Once the iron oxide product and carrier have been reacted with sulfur compounds, the reactant iron oxide product remains stable and non-hazardous according to currently promulgated Environmental Protection Agency and state standards.

When activated, the iron oxide product reacts with sulfur compounds to remove the sulfur compounds from fluids, including gases, liquids, vapors and combinations thereof as well as non-fully saturated fluids. The activated iron oxide product can remove sulfur compounds from fluids including air streams, carbon dioxide streams, nitrogen gas, and hydrocarbon gases, liquids, and combinations thereof. The sulfur compounds that are removed from the fluids include, but are not limited to, $C_1$ to $C_3$ thiols (mercaptans), hydrogen sulfide, carbon disulfides, carbonyl sulfide, and other oxides of sulfur.

The preferred iron oxide bed composition containing the activator is comprised of a carrier equal to from about 0% to about 77% by weight of the total iron oxide bed composition and more preferably form about 59% to about 76.8% by weight. An amount of iron oxide product is added to the iron oxide bed composition equal to from about 3% to about 30% by weight of the total iron oxide bed composition, and more preferably equal to from about 5% to about 22% by weight of the total iron oxide bed composition. An amount of water can be added to the iron oxide bed composition ranging from approximately 0% to approximately 80% by weight of the total iron oxide bed composition and more preferably approximately 18% by weight of the total iron oxide bed composition. Finally, an activator, preferably copper oxide, is added to the iron oxide bed composition in an amount equal to from about 0.125% to about 5% by weight of the total iron oxide bed composition. Preferably, the activator is used in an amount equal to from about 0.25% to about 2% by weight of the total iron oxide bed composition. Larger amounts of the activator, greater than 5% by weight, can be used; however, it is most preferred to use an amount of activator equal to approximately 1% by weight of the total iron oxide bed composition. An alternative embodiment would include an amount of iron oxide product equal to from about 95% to about 99.875% by weight of the total iron oxide bed composition in combination with an amount of activator equal to from about 0.125% to about 2% by weight of the total iron oxide bed composition. Another embodiment would include the use of water as the primary carrier, with the water added in an amount equal to from about 50% to about 80% by weight of the total iron oxide bed composition, an amount of iron oxide product added to the water in an amount equal to from about 5% to about 22% by weight of the iron oxide bed composition, and an activator added to the water and iron oxide product equal to from about 0.125% to about 5% by weight of the total iron oxide bed composition. The preferred combination of activator to iron oxide product is equal to about 1 part by weight of activator to about 10 to about 50 parts by weight of iron oxide product. It should be noted that the amount of activator required is comparatively small when analyzed in view of the oxide product. This is because it takes a comparatively small amount of activator to increase the reactivity of the iron oxide product, or other oxide products.

It should be further noted that the presence of oxygen in the fluid containing sulfur compounds further increases the electro-potential differential between the oxide product and the activator. Thus, even smaller vessels with dramatically shorter contact times are possible for order control applications and hydrogen sulfide removal systems with vapors naturally containing, or with the deliberate addition of, air, which may include oxygen.

In order to further illustrate the present invention, the following examples are given. However, it is to be understood that the examples are for illustrative purposes only and are not to be construed as limiting the scope of the subject invention.

EXAMPLE 1

As will be shown in the following example, smaller-sized reactor vessels can be used for hydrogen sulfide and other sulfur species removal, including thiols (mercaptans), from gaseous and liquid hydrocarbons by adding a small amount of copper oxide activator to an iron oxide based reaction bed contained in a steel reactor vessel.

Hydrocarbon gas samples were filtered in a reactor vessel which was 8 feet in length and had a diameter of 2 inches.

taining the iron oxide mix. As can be seen below, a comparison was made between the efficiency of removal of the iron oxide mix without an activator and the iron oxide mix with an activator, copper oxide. The tests were also broken into nigrogen/carbon dioxide gas samples containing moderate amounts and extreme amounts of $H_2S$. The extreme $H_2S$ contaminated nitrogen/carbon dioxide gas was filtered through an iron oxide mix without an activator, an iron oxide mix containing 1.0% by weight of activator, and an iron oxide mix containing 0.25% by weight of an activator.

|  | Moderate $H_2S$ Contamination | | Extreme $H_2S$ Contamination | | |
| --- | --- | --- | --- | --- | --- |
| Gas Composition | $H_2S$ No Oxygen Carbon Dioxide | 500 ppm in $N_2$ 14% by volume | $H_2S$ Oxygen Carbon Dioxide | 2200 ppm in $N_2$ 4% by volume 14% by volume | |
| Test Results | Iron | 1% | Iron | Copper Oxide | |
|  | Oxide Only | by wt. Copper Oxide | Oxide Only | 1.0% by wt | 0.25% by wt |
| Bed Depth for Complete $H_2S$ Removal | Greater Than 7.9 feet | Less Than 4.7 feet | Greater Than 7.9 feet | Less Than 2.7 feet | Less Than 3.7 feet |

The vessel contained 10 pounds of an experimental iron oxide mix, which contained about 5.921 pounds of an inert carrier, with the carrier being a calcinated montmorillonite carrier, an amount of iron oxide powder equal to approximately 2.15 pounds, and an amount of water equal to approximately 1.9 pounds. Five (5) batches were made of the iron oxide mix, so that five (5) different tests could be conducted in the reactor vessel. Each of the five tests were initiated by passing nitrogen/carbon dioxide gas contaminated with hydrogen sulfide, the amount of hydrogen sulfide contained in contaminated gas is listed below, through the iron oxide mix contained in the reactor vessel. In three of the tests copper oxide was added to the iron oxide mix, the amount of which is listed below. In two of the tests no copper oxide was added to the iron oxide mix. Also, the tests were conducted on different amounts of hydrogen sulfide ($H_2S$) contaminant contained in nitrogen/carbon dioxide gas. Additionally, some nitrogen/carbon dioxide gas samples contained oxygen, the amount of which is listed below. Thus, the nitrogen/carbon dioxide samples that were tested, included samples with oxygen and without oxygen.

The amount of copper oxide activator added the iron oxide bed was equal to about 1% or less by weight of the total bed composition. The actual amount of copper oxide added was about 1% by weight or an amount equal to about 0.1 pounds and about 0.25% by weight or about 0.025 pounds. The specific parameters for each test are listed in the table below. The conditions in the reactor vessel in which the tests were conducted are as follows:

| Test Conditions: | |
| --- | --- |
| Temp | 70° F. |
| Flow Rate of Natural Gas containing $H_2S$ | 5.41 liters/min. |
| Pressure | 0.5 psig. |
| Bed Height | 7.9 ft. |
| Gas was water saturated | |

Contact time for the gas in the test unit was about 50 seconds at the above listed pressure, temperature, and flow rate. The gas was filtered through the reactor vessel con- Measurements were taken by Sensidyne hydrogen sulfide and total mercaptan stain tubes manufactured by the Sensidyne company.

As can be seen, in the moderately contaminated gas the addition of a small amount of activator, copper oxide, substantially decreased the iron oxide bed depth required for complete hydrogen sulfide removal. The iron oxide bed with an activator required 3.2 fewer feet to remove the sulfur compounds than the iron oxide bed without an activator. In the extreme contaminated gas, the activated iron oxide bed required less than half the amount of material, 3.7 feet as compared to 7.9 feet, to remove the sulfur compounds. Furthermore, as can be seen, an increased amount of activator increases the reactivity of the iron oxide. The iron oxide mix having 1% by weight of an activator added thereto only required 2.7 feet to remove the hydrogen sulfide; whereas, the iron oxide mix containing 0.25% by weight of an activator added thereto required less then 3.7 feet to remove the hydrogen sulfide. A lesser amount of iron oxide mix was required to remove the hydrogen sulfide from gas extremely contaminated with $H_2S$ as compared to gas moderately contaminated with $H_2S$. The reason there was better removal in the gas with extreme hydrogen sulfide contamination, as compared to the gas with moderate hydrogen sulfide contamination, was the addition of oxygen to the gas. This shows that oxygen further increases the reactivity of the iron oxide product when an activator is added thereto. It should be pointed out that the addition of the oxygen did not increase the reactivity of the iron oxide product without an activator.

Thus, the above examples demonstrate that the use of an activator results in the ability to use a smaller bed and vessel. The examples also demonstrate that the iron oxide product has increased activity when exposed to an amount of oxygen in combination with an activator.

EXAMPLE 2

The following experiment was conducted to determine the amount of dissolved hydrogen sulfide and mercaptans removed from natural gas liquids (NGL) by an iron oxide product composition containing an activator. The removal of hydrogen sulfide and mercaptans from natural gas liquids is indicated by the reduction of the hydrogen sulfide and mercaptan concentrations measured in the vapor or "headspace" adjacent to the liquid.

Two tests were conducted in two (2) reactor vessels that were 4 feet high. For each test each reactor vessel contained approximately 40 pounds of reaction material, including about 23.684 pounds of solid inert carrier, a montmorillonite carrier, about 7.6 pounds of water, and about 8.6 pounds of iron oxide powder. In one test approximately 0.4 pounds of copper oxide was added to the reaction material, while the other test did not have any copper oxide added to the reaction material.

The tests conditions were as follows:

Natural Gas Liquids (NGL) 72 API (density) at 70° F.

Headspace $H_2S$ Untreated=>4,000 ppm.

Headspace Mercaptans Untreated—The mercaptan content could not be determined due to high $H_2S$ levels.

Flow Rate set at 2" equivalent unoccupied bed rising velocity. Measurements were taken by Sensidyne hydrogen sulfide and total mercaptan stain tubes manufactured by the Sensidyne company.

Test results, as indicated by headspace concentration measurements, were as follows:

| | Iron Oxide Only | Iron Oxide With 1% by wt. Copper Oxide | | | |
|---|---|---|---|---|---|
| | At 4 ft. | At 4 ft. level | | At 8 ft. level | |
| Hours In Test | level $H_2S$ | $H_2S$ | Total Mercaptans | $H_2S$ | Total Mercaptans |
| At Start | 400 ppm* | 0 ppm | 0 ppm | 0 ppm | 0 ppm |
| 6 Hr. of Flow | * | 0 ppm | 35 ppm | 0 ppm | 0 ppm |
| 21 Hr. of Flow | * | 0 ppm | 40 ppm** | 0 ppm | 0 ppm |

*The test was terminated due to the high amount of hydrogen sulfide, greater than 400 ppm, remaining in the headspace of the liquid hydrocarbon.

The liquid hydrocarbon quality was excellent (clear yellow NGL) coming out of the unit(s) loaded with the copper oxide activator and the iron oxide product without the need for further processing. Conversely, the iron oxide product that did not have an activator did not result in sufficient removal of the hydrogen sulfide or mercaptans. Additionally, it should be pointed out that the iron oxide bed at the 8 foot level did not contain any detectable sulfur compounds. This means that the sulfur compounds were removed from the hydrocarbon fluid prior to contacting the iron oxide product at the 8 foot level.

Accordingly, use of the present invention affords at least these significant advantages: increased speed of reactivity permits the use of much smaller beds of reactive materials; and, when mercaptans and/or hydrogen sulfide are present in liquid hydrocarbons, the products of the reaction are odor-free and are no longer contaminated with these sulfur compounds.

EXAMPLE 3

Two reactor vessels were prepared that was 15 feet in length and each reactor vessel contained approximately 30 pounds of iron oxide mix. The iron oxide mix contained about 17.763 pounds of carrier, about 5.7 pounds of water, about 6.45 pounds of iron oxide product, and about 0.087 pounds of copper oxide. The reactor vessel was connected to a carbon dioxide gas source. The carbon dioxide gas, before passage into the reactor, was water saturated through a bubbler and filtered in the reactor under the following conditions:

| | |
|---|---|
| Flow Rate (ft³/hr) | 30 |
| Temperature (°F.) | 70 |
| Pressure (psig) | 400 |
| Bed Height (ft.) | 30 |
| Inlet $H_2S$ (ppm) | 25 |
| Inlet Mercaptans (ppm) | 20 |

The inlet gas contained a number of other sulfur species, in addition to mercaptans and hydrogen sulfide, the most abundant sulfur compounds being methyl and ethyl sulfides and disulfides. Three carbon dioxide gas samples were tested, one sample per day for three consecutive days, with each sample passing through the iron oxide mix in the same reactor. The sulfur components, other than hydrogen sulfide and mercaptans, were not removed by the iron oxide mix. The hydrogen sulfide ($H_2S$) and Mercaptans were removed by about 5 ft. of the iron oxide mix, out of a possible 30 feet. The following table shows the amount of hydrogen sulfide and mercaptans entering the reactor as well as the conditions in the reactor vessel. The following table shows the data that was collected and formulated with measurements taken by Sensidyne hydrogen sulfide and total mercaptan stain tubes manufactured by the Sensidyne company and test trailer meters.

| | Sample 1 | Sample 2 | Sample 3 |
|---|---|---|---|
| Inlet $H_2S$ (ppm) | 25 | 22 | 24 |
| Inlet Mercaptans (ppm) | 20 | 20 | 20 |
| First Port $H_2S$ (ppm) | 0 | 0 | 0 |
| First Port Mercaptans (ppm) | 0 | 0.5 | 0.75 |
| Column 1 temp (°F.) | 85 | 68 | 84 |
| Column 1 press (psig) | 410 | 410 | 400 |
| Flow (ft³/hr.), actual | 30 | 30 | 30 |

The tested samples revealed that the activated iron oxide mix removed the contaminants with 5 feet of iron oxide mix from the contaminated carbon dioxide streams. Specifically, it should be noted that no contaminants were detected at the second port or 10 foot mark. The tests showed that no hydrogen sulfide ($H_2S$) or mercaptans passed the first 15 feet of the reactor. Thus, the iron oxide mix with an activator was able to remove hydrogen sulfide and mercaptans from water saturated carbon dioxide streams.

EXAMPLE 4

Two reactor vessels were prepared that were each 15 feet in length and each reactor vessel contained approximately 30 pounds of iron oxide mix. The iron oxide mix contained about 17.763 pounds of carrier, about 5.7 pounds of water, about 6.45 pounds of iron oxide product, and about 0.087 pounds of copper oxide. The reactor vessel was connected to a carbon dioxide gas well. The carbon dioxide gas was 20% water saturated and was run in the reactor under the following conditions:

| | |
|---|---|
| Flow Rate (ft³/hr) | 30 |
| Temperature (°F.) | 70 |
| Pressure (psig) | 400 |
| Bed Height (ft.) | 32 |

-continued

| Inlet H$_2$S (ppm) | 25 |
|---|---|
| Inlet Mercaptans (ppm) | 20 |
| Inlet Carbonyl Sulfide (ppm) | .025 |

The inlet gas contained a number of other sulfur species, in addition to mercaptans, hydrogen sulfide, and carbonyl sulfide, the most abundant sulfur compounds being methyl and ethyl sulfides and disulfides. Three carbon dioxide gas samples were tested, one sample tested per day for three consecutive days, with each sample passing through the iron oxide mix in the same reactor. Hydrogen sulfide and mercaptans were tested for, in addition to carbonyl sulfide. Other sulfur compounds were not removed by the iron oxide mix, nor were they tested for. The following table shows the amount of hydrogen sulfide, mercaptans, and carbonyl sulfide entering the reactor as well as the conditions in the reactor vessel. The following table shows the data that was collected and formulated with measurements taken by Sensidyne hydrogen sulfide and total mercaptan stain tubes manufactured by the Sensidyne company and test trailer meters.

|  | Sample 1 | Sample 2 | Sample 3 |
|---|---|---|---|
| Inlet H$_2$S (ppm) | 25 | 22 | 24 |
| Inlet Mercaptans (ppm) | 20 | 20 | 20 |
| Inlet Carbonyl Sulfide | 0.025 | 0.025 | 0.025 |
| First port H$_2$S (ppm) | 0 | Broke through port 3 (15 ft) | Broke through port 3 (15 ft) |
| First port Mercaptans (ppm) | 0 | Broke through port 3 (15 ft) | Broke through port 3 (15 ft) |
| First port Carbonyl sulfide | 0 | Broke through port 2 (10 ft) | Broke through port 3 (15 ft) |
| Column 1 temp (°F.) | 54 | | |
| Column 1 press (psig) | 410 | | |
| Flow (ft$^3$/hr), actual | 30 | | |

As can be seen, the activated iron oxide product did not remove the sulfur compounds from the water unsaturated carbon dioxide gas as effectively as it did the sulfur compounds from the water saturated carbon dioxide gas. But, the activated iron oxide product still removed sulfur compounds from the unsaturated carbon dioxide gas.

Thus, there has been shown and described a novel method and composition for activating oxides reactant with sulfur compounds to remove sulfur compounds from fluids which fulfill all the objects and advantages sought therefore. It is be apparent to those skilled in the art, however, that many changes, variation, modification, and other uses and applications for the subject method and composition are possible, and also such changes, variations, modifications, and other uses and applications which do not depart from the spirit and scope of the invention are deemed to be covered by the invention which is limited only by the claims which follow.

What is claimed is:

1. A process for increasing the efficiency of removal of sulfur compounds from fluids, comprising passing the fluids through an oxide product, which is reactive with sulfur and is selected from the group consisting of iron oxide, zinc oxide and combinations thereof, and which oxide product is carried upon montmorillonite, having an effective amount of an activator, selected from the group consisting of platinum oxide, gold oxide, silver oxide, copper oxide, cadmium oxide, nickel oxide, palladium oxide, lead oxide, mercury oxide, tin oxide and cobalt oxide, added to the oxide product with said activator added to the oxide product in an amount equal to from about 0.125% by weight to about 5% by weight of the total composition, with said activator increasing the rate of reactivity of the oxide product with the sulfur compounds found in the fluid, so that the oxide product removes the sulfur from the fluids.

2. The process of claim 1, wherein said activator is added to the oxide product in a ratio equal to 1 part by weight of said activator to about 10 to about 50 parts by weight of the oxide product.

* * * * *

UNITED STATES PATENT AND TRADEMARK OFFICE
CERTIFICATE OF CORRECTION

PATENT NO. : 5,792,438
DATED : August 11, 1998
INVENTOR(S) : Delbert C. Scranton, Jr.

It is certified that error appears in the above-identified patent and that said Letters Patent is hereby corrected as shown below:

Col. 9, line 41, please add the following paragraph -- **Insignificant increase in mercaptan levels indicate maximum concentration has been reached. -- .

Signed and Sealed this

Twenty-seventh Day of October, 1998

Attest:

BRUCE LEHMAN

Attesting Officer

Commissioner of Patents and Trademarks